June 18, 1968 L. F. HILL, SR., ET AL 3,388,920
FOLDABLE TWO-WAY SHOPPING CART
Filed Jan. 23, 1967 2 Sheets-Sheet 1
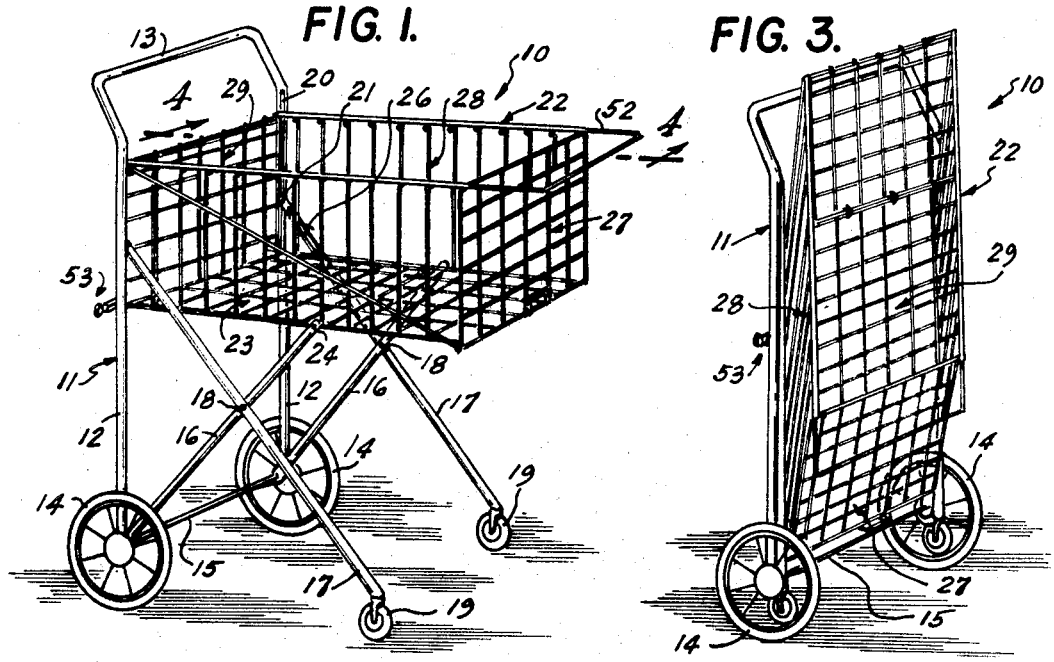
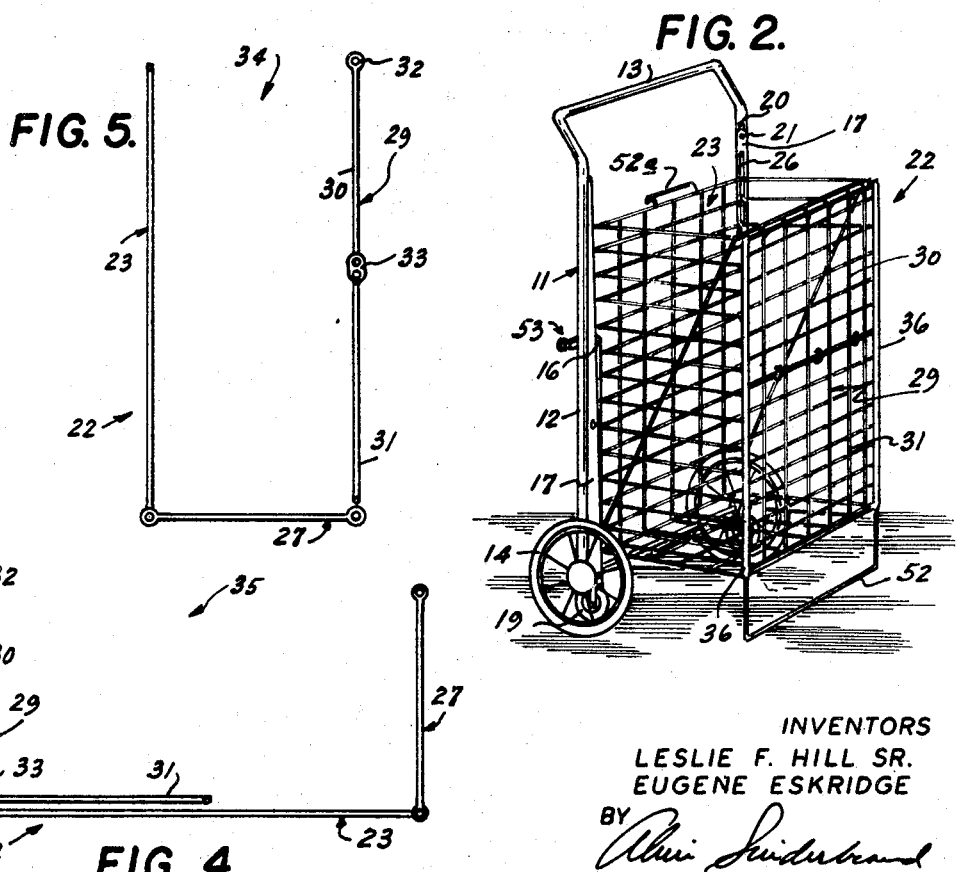
INVENTORS
LESLIE F. HILL SR.
EUGENE ESKRIDGE
BY
ATTORNEY

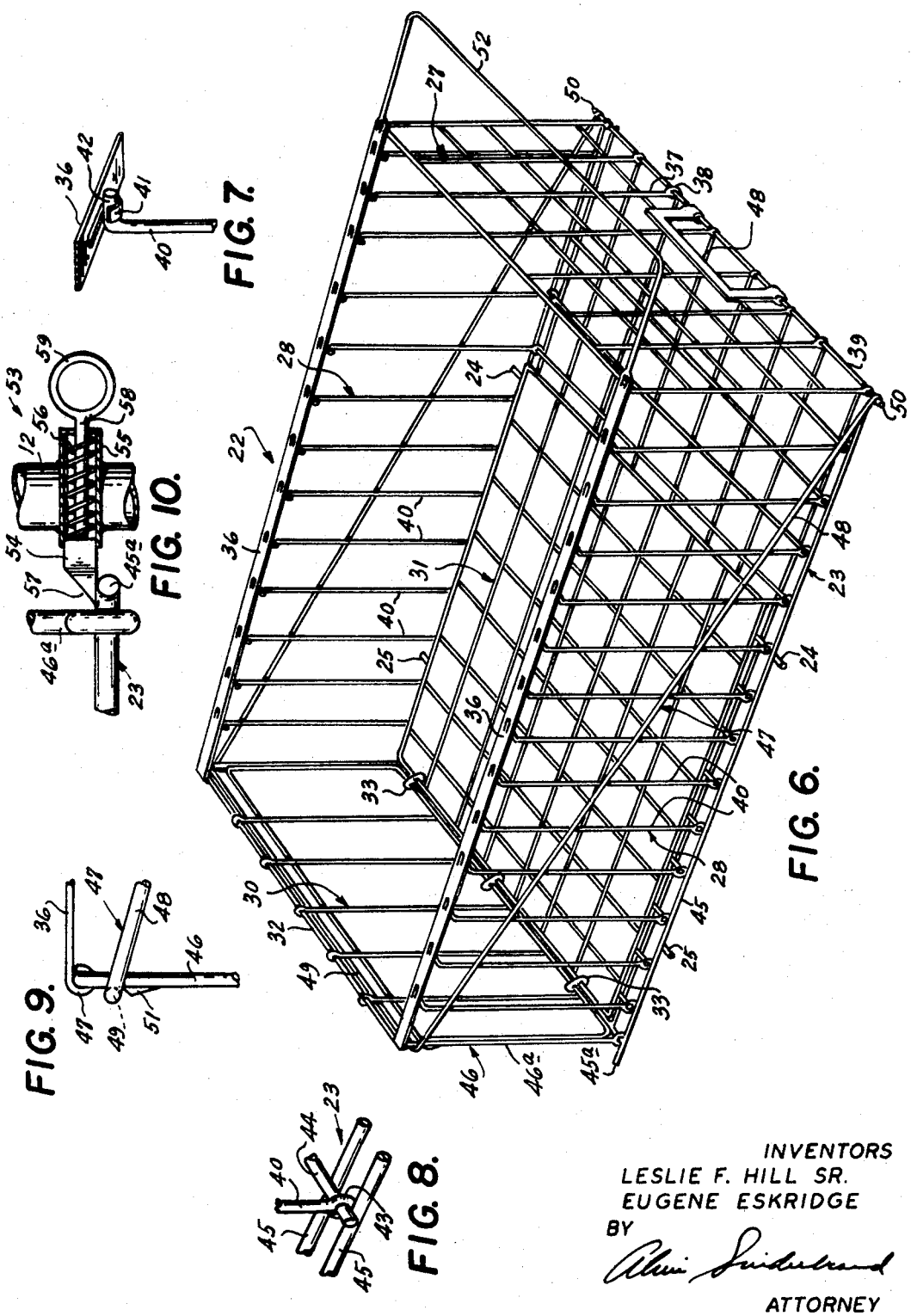

United States Patent Office 3,388,920
Patented June 18, 1968

3,388,920
FOLDABLE TWO-WAY SHOPPING CART
Leslie F. Hill, Sr., Hollis, and Eugene Eskridge, St.
Albans, N.Y., assignors to Hillridge Dual-Cart
Corp., Hollis, N.Y., a corporation of New York
Filed Jan. 23, 1967, Ser. No. 610,863
8 Claims. (Cl. 280—41)

ABSTRACT OF THE DISCLOSURE

A shopping cart having a convertible frame which is movable between an extended position, where the cart is movable along a supporting surface on a pair of main wheels and a pair of auxiliary wheels spaced forwardly from the main wheels, and a contracted position, where the cart is movable only on the main wheels, is provided with a basket-like carrier which extends horizontally in the extended position of the frame and vertically in the contracted position of the frame, and such carrier has a foldable wall serving alternatively to close the front of the carrier when the latter is vertical and to close the back of the carrier when the latter is horizontal. The basket-like carrier is constructed to collapse flat against the convertible frame when the latter is in its nested position.

---

This invention relates generally to shopping carts, and more particularly is directed to improvements in two-way shopping carts of the type having a basket-like carrier for articles which may be disposed horizontally and supported at a relatively high elevation on a pair of main wheels and a pair of auxiliary wheels spaced forwardly from the main wheels or disposed vertically at a relatively lower level on only the main wheels, for example, as shown in U.S. Patent No. 3,168,328, issued Feb. 2, 1965, to Leslie F. Hill, Sr.

In the previously proposed two-way shopping carts of the described character, the basket-like carrier has a main wall, an end wall extending from the end of the main wall which is lowermost in the vertical position of the carrier, and side walls extending from the opposite sides of the main wall. Further, the known carrier has two doors hinged to the edges of the side walls remote from the main panel to close the front of the carrier in its vertical position and to permit access to the carrier from above in its horizontal position, and an end door hingedly mounted between the ends of the side walls which are uppermost in the vertical position to permit access to the carrier from above in such position and to close the back of the carrier in its vertical position. The known basket-like carrier for two-way shopping carts cannot be collapsed so that, even when the frame is in its contracted position, a relatively large space is required for storage of the cart.

Accordingly, it is an object of the invention to provide a two-way shopping cart of the described type in which the construction of its basket-like carrier is simplified, particularly as regards the means for closing the front and back of the carrier in the vertical and horizontal positions, respectively, thereof.

Another object is to provide a basket-like carrier for a two-way shopping cart of the described character which can be collapsed, particularly when the frame is in its contracted position, to minimize the space required for storage of the cart.

In accordance with an aspect of this invention, a two-way shopping cart of the described character is provided with a basket-like carrier comprising a rigid main wall articulately connected to the cart frame for movement between a vertical position when the frame is contracted and a horizontal position when the frame is extended, an end wall extend from the end of the main wall which is lowermost in the vertical position of the main wall, side walls extending along the opposite sides of the main wall, and a foldable wall hingedly mounted, at one end, between the ends of the side walls remote from the end wall and being selectively disposable to close the back of the carrier when the main wall is horizontal and to close the front of the carrier when the main wall is vertical.

In a preferred embodiment of the invention, the foldable wall for selectively closing the back and front of the carrier in the horizontal and vertical positions, respectively, of the carrier includes a first panel which is substantially coextensive with the opening at the top of the carrier in the vertical position of the latter and has the axis of the hinged mounting of the foldable wall extending along one of its transverse edges, and a second panel hingedly joined to said first panel at the other transverse edge of the latter and together with the first panel being substantially coextensive with the opening at the top of the carrier in the horizontal position of the latter.

It is another feature of this invention to hingedly connect the end wall of the carrier to the main wall thereof so that such end wall can swing between an erected position at right angles to the main wall and a collapsed position lying against the main wall, to form each of the side walls of the carrier of a rail extending parallel to the main wall and pivotally connected to the end wall and a series of parallel links pivotally connected, at their opposite ends, to the rail and to the respective side of the main wall so that the distance between the rails and the main wall is increased and decreased, respectively, by movement of the end wall to its erected and collapsed positions, and to provide releasable means to retain the end wall in its erected position.

The above, and other objects, features and advantages of the invention, will be apparent in the following detailed description of embodiments thereof which is to be read in connection with the accompanying drawings, wherein:

FIG. 1 is a perspective view of a two-way shopping cart embodying this invention which is shown with its basket-like carrier disposed horizontally;

FIG. 2 is a view similar to that of FIG. 1, but showing the basket-like carrier arranged vertically;

FIG. 3 is a view similar to that of FIG. 2, but showing the carrier collapsed to permit storage of the cart in a small space;

FIG. 4 is a diagrammatic sectional view taken along the line 4—4 on FIG. 1, and illustrating the manner in which a foldable wall forming part of the basket-like carrier in accordance with this invention serves to close the back of the carrier when the latter is in its horizontal position;

FIG. 5 is a view similar to that of FIG. 4, but illustrating the basket-like carrier in its vertical position with the foldable wall of the carrier closing the front thereof;

FIG. 6 is an enlarged perspective view of the basket-like carrier embodying this invention;

FIG. 7 is a fragmentary, enlarged perspective view illustrating a detail of the construction of each side wall of the carrier;

FIG. 8 is a fragmentary, enlarged perspective view illustrating another detail of the side wall construction of the carrier;

FIG. 9 is an enlarged, fragmentary elevational view showing a detail of the arrangement by which the basket-like carrier is retained in its erected condition; and FIG. 10 is an enlarged detail view, partly in section, showing a latch for locking the carrier in its horizontal position.

Referring to the drawings in detail, and initially to FIG. 1 thereof, it will be seen that a shopping cart 10 of the type to which this invention relates comprises a main frame member 11 which may be of inverted U-shaped configuration so as to have generally erect sides 12, for example, of metal tubing, joined at their upper ends by a cart handle 13. Main wheels 14 are rotatably mounted at the lower ends of sides 12 of main frame member 11, for example, on the ends of an axle 15 suitably journalled in main frame member 11. Cart 10 further has auxiliary frame members that consist of a pair of laterally spaced link members 16 having their lower ends pivotally connected to the lower ends of the respective sides 12 of main frame member 11, for example, by being pivoted on axle 15, and a pair of leg members 17 each pivotally connected intermediate its ends to one of the link members 16 between the ends of the latter, as at 18. Auxiliary wheels 19, which are preferably in the form of casters, are mounted at the lower ends of leg members 17. The upper ends of leg members 17 are connected to the upper portions of sides 12 of the main frame so as to be slidable therealong and free to pivot relative to the main frame 11, for example, as shown, by providing the upper end portion of each side 12 of main frame member 11 with a longitudinal slot 20 in which there is slidably retained a pivot pin 21 connected to the upper end of the adjacent leg member 17.

The cart 10 further comprises a basket-like carrier 22 which includes a rigid, generally rectangular main wall 23 having pins 24 projecting laterally from its opposite sides intermediate the ends of wall 23 (FIG. 6) and serving to connect such main wall to the upper ends of link members 16 (FIG. 1). Main wall 23 is also pivotally and slidably connected to the upper end portions of leg members 17, for example, by pins 25 projecting laterally from the opposite sides of main wall 23 adjacent an end of the latter (FIG. 6) and being slidably received in longitudinal slots 26 (FIG. 1) extending longitudinally in the upper end portions of leg members 17.

As will be apparent, the auxiliary frame members 16 and 17 are movable with respect to main frame member 11 from extended positions which dispose main wall 23 of carrier 22 horizontally at a substantial elevation above a supporting surface engaged by main wheels 14 and also by auxiliary wheels 19 spaced forwardly from the main wheels, as shown on FIG. 1, to nested or contracted positions lying substantially in the same plane as the erect sides 12 of main frame member 11 and which dispose main wall 23 of the carrier substantially vertically with the lowermost end of wall 23 being at a relatively small height above the supporting surface along which the cart is then movable on main wheels 14 alone.

Carrier 22 in accordance with this invention further generally includes an end wall 27 extending from the end of main wall 23 which is lowermost in the vertical position thereof so that end wall 27 forms either the bottom of the carrier when main wall 23 is in its vertical position (FIG. 5) or the front of the carrier when main wall 23 is in its horizontal position (FIGS. 1, 4 and 6); side walls 28 extending from the opposite sides of main wall 23 along the latter and each being joined, at one end, to end wall 27 (FIG. 6); and a foldable wall 29 which is selectively disposable to close the back of carrier 22 when main wall 23 is in its horizontal position (FIGS. 1, 4 and 6) and to close the front of carrier 22 when main wall 23 is in the vertical position (FIGS. 2 and 5).

As indicated diagrammatically on FIGS. 4 and 5, foldable wall 29 is composed of a first panel 30 dimensioned to be substantially coextensive with the opening appearing at the top of carrier 22 when main wall 23 is in its vertical position, and a second panel 31 dimensioned so that panels 30 and 31, when arranged edge-to-edge in a common plane, are substantially coextensive with the opening appearing at the top of carrier 22 with main wall 23 in its horizontal position. Panel 30 is hingedly mounted, at one of its transverse edges, for swinging about an axis 32 (FIGS. 4, 5 and 6) which extends laterally between side walls 28 at the ends of the latter remote from end wall 27 and which is spaced from main wall 23 by being included in the plane of the free edges or rims of side walls 28. Further, a transverse edge of panel 31 is pivotally connected, as by hinges 33, to the transverse edge of panel 30 remote from axis 32. Thus, when carrier 22 is disposed with its main wall 23 in vertical position (FIGS. 2 and 5), gravity causes panel 30 to depend vertically from axis 32 and panel 31 is similarly made to depend from panel 30 in the same vertical plane to close the front of the carrier, while having an opening 34 (FIG. 5) at the top of the carrier for the reception of packages or articles. On the other hand, when carrier 22 is displaced to dispose its main wall 23 is horizontal position (FIGS. 1, 4 and 6), panel 30 is angularly displaced by gravity relative to walls 23, 27 and 28 so as to continue to depend vertically from axis 32 and thereby close the back of carrier 22, while panel 31 extends forwardly from the lower edge of panel 30 and rests on a portion of main wall 23 to leave an opening 35 at the top of the basket-like carrier for the reception of packages or articles.

As shown particularly on FIG. 6, main wall 23, end wall 27, and panels 30 and 31 of foldable wall 29 are preferably formed of reticulated metal wires or rods which are welded or otherwise secured to each other at their intersections so as to form suitably rigid wall structures. In order to permit basket-like carrier 22 to collapse and thereby minimize the space required for storage of cart 10, end wall 27 is preferably pivotally connected to the adjacent end of main wall 23 for swinging from an erected position (FIGS. 1, 2 and 6) to a collapsed position lying substantially against main wall 23 (FIG. 3), and side walls 28 are preferably constructed so as to decrease the distance from their free edges or margins 36 to main wall 23 upon movement of end wall 27 from its erected position to its collapsed position.

As shown on FIG. 6, the pivotal connection of end wall 27 to main wall 23 may be achieved by providing rods 37 of end wall 27 with eyes 38 at ends thereof which are pivoted on a transverse end rod 39 of main wall 23. Further, for the purpose described above, each of side walls 28 is formed of a rigid rail constituting its free edge or margin 36 and being pivotally connected, at one end, to end wall 27, and a series of parallel links 40 which are pivotally connected, at their opposite ends, to rail 36 and to the respective side of main wall 23 so as to maintain rail 36 parallel to the plane of main wall 23. As shown in detail on FIG. 7, the pivotal connection of each link 40 with the respective rail 36 can be constituted by a hook 41 struck from rail 36 and embracing a laterally bent end 42 of the link, and a similar pivotal connection can be provided between each rail 36 and end wall 27. As shown in detail on FIG. 8, the pivotal connection of each link 40 with main wall 23 may be constituted by an eye 43 formed on the respective end of link 40 to pivotally embrace a laterally extending rod 44 of main wall 23 between two adjacent longitudinal rods 45 of the main wall which form the longitudinal edge structure of wall 23.

Further, as shown on FIG. 6, carrier 22 may have a generally U-shaped rod member 46 consisting of parallel sides 46a which are pivotally connected, at their free ends, to the end of main wall 23 remote from end wall 27 and which are joined by a bight portion constituting the pivoting axis 32 of panel 30. The adjacent ends of rails 36 are preferably pivotally connected to bight portion 32, as by having eyes 47 (FIG. 9) formed on the ends of the rails and embracing portion 32. The swinging movement of end wall 27 away from main wall 23 is suitably limited at the erect position of end wall 27, for example, as by a stop member 48 (FIG. 6) which is welded or otherwise secured on rod 39 and engageable by the outer surface of end wall 27 in its erect position.

In order to releasably retain end wall 27 and side walls 28 in their erect positions, carrier 22 further includes a bail member 47 having parallel, elongated sides 48 connected, at one end, by a cross member 49. The free ends of sides 48 are pivotally connected to end extensions of rod 39, as at 50, and sides 48 are dimensioned longitudinally so that, when end wall 27 and side walls 28 are in their erected positions (FIG. 6), sides 48 can extend diagonally across walls 28 and position cross member 49 against the sides 46a adjacent bight portion 32 of rod member 46 which is pivotally connected to the adjacent ends of rails 36, thereby to maintain walls 27 and 28 in their erected positions. Bail member 47 is yieldably held in its oblique or diagonal operative position shown on FIGS. 6 and 9, for example, by noses 51 projecting from sides 46a and over which cross member 49 must be forcibly displaced when swinging bail member 47 from its operative position to an inoperative position in the plane of main wall 23. Obviously, when bail member 47 is displaced to its inoperative position in the plane of main wall 23, end wall 27 and links 40 of side walls 28 are free to pivot in the counter-clockwise direction relative to main wall 23, as viewed on FIG. 6, thereby to collapse walls 27 and 28 to the position shown on FIG. 3.

It is further to be noted that rails 36 of side walls 28 project inwardly with respect to links 40 and that panels 30 and 31 of foldable wall 29 are laterally dimensioned to rest, at their side edges, against rails 36 when carrier 22 is in the vertical position of FIGS. 2 and 5. Thus, articles placed in carrier 22 cannot displace wall 29 outwardly beyond the plane of rails 36.

If desired, a stand 52 may extend rigidly from rails 36 beyond end wall 27 so as to be engageable with a supporting surface for holding the cart erect when basket-like carrier 22 is in its vertical position (FIG. 2). The stand 52 may alternatively function as a handle by which the cart can be drawn or pulled when carrier 22 is in its horizontal position (FIG. 1). A handle 52a (FIG. 2) may also be provided on the laterally extending rod at the end of main wall 23 remote from end wall 27, and by which main wall 23 may be grasped for effecting its displacement from the horizontal position of FIG. 1 to the vertical position of FIG. 2.

It will be apparent that the described embodiment of this invention employs a single foldable wall 29 which is displaceable for selectively closing either the back of carrier 22 or the front of such carrier, depending upon whether the carrier is in its horizontal position or its vertical position, respectively, and that displacement of foldable wall 29 is automatically effected by gravity upon displacement of carrier 22 between its vertical and horizontal positions. Thus, converting of the two-way shopping cart from one condition to the other condition thereof, as illustrated on FIGS. 1 and 2, can be simply effected merely by suitable displacement of main wall 23 of the carrier. Further, it will be apparent that the carrier 22 embodying this invention may be collapsed, as shown on FIG. 3 to minimize the space required for its storage.

If desired, as shown on FIGS. 1 and 10, a latch mechanism 53 may be provided for releasably locking carrier 22 in its horizontal position. Such latch mechanism 53 may include a latch bar 54 slidable in a housing 55 which is welded or otherwise secured to a side 12 of main frame member 11 and which is urged by a spring 56 to project laterally inward therefrom over an end extension 45a (FIG. 6) of the longitudinal rod 45 at the adjacent side of wall 23 of the carrier when the latter is in its horizontal position. The latch bar 54 may have an oblique surface 57 on its end or nose so that extension 45a can move downwardly past bar 54 during movement of carrier 22 from its vertical position to its horizontal position. Further, a stem 58 projects outwardly from bar 54 and terminates in a ring or knob 59 by which bar 54 can be retracted into housing 55, thereby to free carrier 22 for movement from its horizontal position.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. A shopping cart comprising:
   a frame including a substantially erect main frame member having a cart handle at its upper end, laterally spaced main wheels rotatably mounted at the lower end of said main frame member for movement of the cart along a supporting surface, auxiliary frame means articulately connected to said main frame member for movement relative thereto between a nested position substantially coplanar with said main frame member and an extended position where said auxiliary frame means projects forwardly from said main frame member, and auxiliary wheel means rotatably mounted on said auxiliary frame means and being adapted, in said extended position of the latter, to engage the supporting surface along which the cart is movable at locations spaced forwardly from said main wheels; and
   a carrier for articles including a main rigid wall articulately connected to said frame for movement between a substantially vertical position coplanar with said main frame member when said auxiliary frame means is in said nested position and a substantially horizontal position when said auxiliary frame means is in said extended position, an end wall extending from the end of said main wall which is lowermost in said vertical position thereof thereby to form the bottom of the carrier in said vertical position of the main wall and the front of the carrier in said horizontal position of the main wall, side walls extending from the opposite sides of said main wall along the latter and being each joined, at one end, to said end wall, and a foldable wall pivotally mounted, at one end, between the other ends of said side walls to swing about an axis spaced from said main wall and being selectively disposable to close the back of said carrier when said main wall is in said horizontal position and to close the front of said carrier when said main wall is in said vertical position.

2. A shopping cart according to claim 1; wherein said foldable wall includes a first panel having said pivoting axis of the foldable wall extending along a transverse edge of said first panel and being substantially coextensive with said end wall, and a second panel hingedly joined to said first panel at the opposite transverse edge of the latter and together with the first panel being substantially coextensive with said main wall.

3. A shopping cart according to claim 1; wherein said end wall is hingedly joined to said main wall to swing from an erected position at right angles to said main wall to a collapsed position lying against said main wall, and said side walls each include a rail extending parallel to said main wall and pivotally connected to said end wall and a series of parallel links pivotally connected, at their opposite ends, to said rail and to the respective side of said main wall to permit movement of said rail with said end wall between an erected position spaced substantially from said main wall and a collapsed position lying close to said main wall; and further comprising releasable means to retain said end wall and the rails of said side walls in said erected positions thereof.

4. A shopping cart according to claim 3; wherein said releasable means for retaining the end walls and rails of the carrier in said erected positions includes a bail member having sides pivotally mounted, at their ends, on said main wall to swing relative to the latter about a transverse axis from the plane of said main wall to an operative position obliquely disposed relative to said main wall, and a bight portion bearing against one of said links of each side wall adjacent said rail thereof in said operative position of the bail member.

5. A shopping cart according to claim 4; wherein said one link of each side wall has means thereon engageable by said bail member in said operative position to yieldably resist return of said bail member to said plane of the main wall.

6. A shopping cart according to claim 3; wherein said carrier further includes a stand extending from said rails of the side walls beyond said end wall to rest on the supporting surface and cooperate with said main wheels in holding said main frame member erect when said auxiliary frame members are in said nested position.

7. A shopping cart according to claim 1; wherein said main frame member has spaced sides joined, at their upper ends, by said cart handle, and said auxiliary frame means includes a pair of laterally spaced link members each pivotally connected at its lower end to said main frame member adjacent the lower end of a respective one of said sides of the main frame member, a pair of leg members having said auxiliary wheel means rotatably supported from their lower ends and each pivotally connected intermediate its ends to one of said link members between the ends of the latter, means pivotally connecting the upper end of each of said link members to a respective side of said main wall of the carrier intermediate the ends thereof, first pivot means slidable along the upper portions of said sides of the main frame member and pivotally connecting the upper ends of said leg members thereto, and second pivot means slidable along said leg members between said first pivot means and the pivotal connections of said leg members with said link members, said second pivot means being connected with the sides of said main wall of the carrier between the pivotal connections of said main wall with said link members and the end of the carrier remote from said end wall thereof.

8. A shopping cart according to claim 1; further comprising latch means carried by said main frame member and being releasably engageable with said carrier to hold said main wall of the latter in said horizontal position.

References Cited
UNITED STATES PATENTS 3,168,328    2/1965    Hill _____ 280—36
3,336,039    8/1967    Chute et al. _____ 280—41

BENJAMIN HERSH, *Primary Examiner.*

R. SONG, *Assistant Examiner.*